United States Patent
Park et al.

(10) Patent No.: US 11,228,398 B2
(45) Date of Patent: Jan. 18, 2022

(54) METHOD FOR RATE MATCHING IN WIRELESS COMMUNICATION SYSTEM AND APPARATUS THEREFOR

(71) Applicant: LG Electronics Inc., Seoul (KR)

(72) Inventors: Jonghyun Park, Seoul (KR); Jiwon Kang, Seoul (KR); Kijun Kim, Seoul (KR); Changhwan Park, Seoul (KR); Suckchel Yang, Seoul (KR); Kunil Yum, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 136 days.

(21) Appl. No.: 16/606,478

(22) PCT Filed: Apr. 18, 2018

(86) PCT No.: PCT/KR2018/004487
§ 371 (c)(1),
(2) Date: Oct. 18, 2019

(87) PCT Pub. No.: WO2018/194363
PCT Pub. Date: Oct. 25, 2018

(65) Prior Publication Data
US 2021/0105090 A1    Apr. 8, 2021

Related U.S. Application Data

(60) Provisional application No. 62/486,960, filed on Apr. 18, 2017.

(51) Int. Cl.
*H04L 1/00* (2006.01)
*H04L 1/16* (2006.01)
(Continued)

(52) U.S. Cl.
CPC .......... *H04L 1/0068* (2013.01); *H04L 1/1614* (2013.01); *H04L 25/0226* (2013.01);
(Continued)

(58) Field of Classification Search
CPC ............ H04L 1/0068; H04W 72/0413; H04W 72/0453
See application file for complete search history.

(56) References Cited

U.S. PATENT DOCUMENTS

2015/0372792 A1* 12/2015 Damnjanovic ....... H04W 72/02
370/329
2016/0242121 A1    8/2016 Lin et al.
(Continued)

FOREIGN PATENT DOCUMENTS

KR    10-2012-0018051    2/2012
KR    10-2014-0031901    3/2014

OTHER PUBLICATIONS

Guangdong OPPO Mobile Telecom, On SRS design for NR, R1-1704612, 3GPP TSG RAN WG1 Meeting #88bis, Spokane, USA, Apr. 3-7, 2017, 4 pages.
(Continued)

*Primary Examiner* — Zhiren Qin
(74) *Attorney, Agent, or Firm* — Fish & Richardson P.C.

(57) ABSTRACT

A method for rate matching (RM) by a terminal in a wireless communication system according to an embodiment of the present invention may comprise the steps of: receiving control information for transmission of a physical uplink shared channel (PUSCH) of the terminal; and transmitting the PUSCH on the basis of the control information, wherein the control information includes RM information indicating time and/or frequency information of a position of an RM resource to which the PUSCH is not mapped.

17 Claims, 11 Drawing Sheets

(51) Int. Cl.
*H04L 25/02* (2006.01)
*H04W 72/04* (2009.01)
*H04W 72/14* (2009.01)
*H04W 80/02* (2009.01)

(52) U.S. Cl.
CPC ..... *H04W 72/042* (2013.01); *H04W 72/0413* (2013.01); *H04W 72/0446* (2013.01); *H04W 72/0453* (2013.01); *H04W 72/14* (2013.01); *H04W 80/02* (2013.01)

(56) References Cited

U.S. PATENT DOCUMENTS

| | | | |
|---|---|---|---|
| 2016/0295526 A1* | 10/2016 | Park | H04L 5/0051 |
| 2017/0013565 A1* | 1/2017 | Pelletier | H04W 52/365 |
| 2017/0026958 A1 | 1/2017 | Noh et al. | |
| 2017/0070994 A1* | 3/2017 | Rico Alvarino | H04L 5/0007 |
| 2017/0141901 A1* | 5/2017 | Rico Alvarino | H04L 5/0051 |
| 2017/0238190 A1* | 8/2017 | Yang | H04L 5/0048 370/329 |
| 2017/0303220 A1* | 10/2017 | Sadeghi | H04L 5/0053 |
| 2018/0323917 A1* | 11/2018 | Um | H04L 27/0006 |

OTHER PUBLICATIONS

Korean Notice of Allowance in Korean Appln. No. 10-2019-7030175, dated Apr. 22, 2020, 7 pages (with English translation).
LG Electronics, Clarification of PUSCH rate matching with SRS, R1-143393, 3GPP TSG RAN WG1 Meeting #78, Dresden, Germany, Aug. 18- Aug. 22, 2014, 7 pages.
LG Electronics, Discussion on NR-PUCCH resource allocation, R1-1704911, 3GPP TSG RAN WG1 Meeting #88bis, Spokane, USA Apr. 3-7, 2017, 6 pages.
LG Electronics, Discussion on UL channel multiplexing in NR, R1-1704912, 3GPP TSG RAN WG1 Meeting #88bis, Spokane, USA Apr. 3-7, 2017, 6 pages.
PCT International Search Report in International Appln. No. PCT/KR2018/004487, dated Aug. 8, 2018, 9 pages (with English translation).
Samsung, Multiplexing Short PUCCH with PDSCH or SRS, R1-1705397, 3GPP TSG RAN WG1 #88bis, Spokane, USA, Apr. 3-7, 2017, 3 pages.

* cited by examiner (a)

(b)

METHOD FOR RATE MATCHING IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2018/004487, filed on Apr. 18, 2018, which claims the benefit of U.S. Provisional Application No. 62/486,960, filed on Apr. 18, 2017. The disclosures of the prior applications are incorporated by reference in their entirety.

TECHNICAL FIELD

The present disclosure relates to a wireless communication system, and more particularly to a rate matching method of a user equipment (UE) and a device therefor.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present disclosure is to propose an effective RM method for preventing occurrence of a collision between data transmission and SRS transmission in a wireless communication system.

Technical problems to be solved by the present disclosure are not limited by the above-mentioned technical problems, and other technical problems which are not mentioned above can be clearly understood by a person having ordinary skill in the art to which the disclosure pertains on the basis of the following description.

Technical Solution

In one aspect, there is provided a rate matching (RM) method of a user equipment (UE) in a wireless communication system, the RM method comprising receiving control information for a physical uplink shared channel (PUSCH) transmission of the UE; and transmitting the PUSCH based on the control information, wherein the control information includes RM information indicating time information and/or frequency information on a RM resource location to which the PUSCH is not mapped.

The control information may be received via downlink control information (DCI) and/or medium access control (MAC) control element (CE).

A sounding reference signal (SRS) transmitted by other UE may be mapped to the RM resource.

The RM information may indicate symbol index information and/or symbol location bitmap information as the time information, and may indicate resource element information, resource element group information, and/or resource block information as the frequency information.

The frequency information may be associated and indicated independent from the time information for each RM resource, or may be commonly associated and indicated with the time information for a plurality of RM resources.

The time information may be restricted to indicate symbols that are contiguously or non-contiguously located in a time domain, and/or the frequency information may be restricted to indicate resource elements that are contiguously or non-contiguously located in a frequency domain.

A frequency location of the RM resource may be determined considering a frequency band scheduled to the UE by a resource allocation (RA) field in an uplink (UL) grant that is additionally pre-configured to the frequency information.

The frequency location of the RM resource may be determined as an area overlapping a frequency band scheduled to the UE among the frequency information.

The pre-configured UL grant may be restricted to the same DCI as the DCI including the RM information, or may be restricted to DCI having a before and after relation pre-defined with the DCI including the RM information.

The transmitting of the PUSCH based on the control information may comprise mapping the PUSCH to a resource excluding the RM resource to transmit the PUSCH, or mapping the PUSCH to a resource including the RM resource, the RM resource being zero-padded and transmitted.

Whether to map to the RM resource of the PUSCH may be determined based on whether a transmission of the SRS is periodic and/or whether the SRS transmission of the other UE has been triggered via the same DCI as the PUSCH.

Whether to map to the RM resource of the PUSCH may be determined based on an interval between a scheduling time of the PUSCH and a SRS transmission triggering time for the other UE.

In another aspect, there is provided a user equipment (UE) performing a rate matching (RM) in a wireless communication system, the UE comprising a radio frequency (RF) unit configured to transmit and receive a radio signal; and a processor configured to control the RF unit, wherein the processor is configured to receive control information for a physical uplink shared channel (PUSCH) transmission of the UE, and transmit the PUSCH based on the control information, wherein the control information includes RM information indicating time information and/or frequency information on a RM resource location to which the PUSCH is not mapped.

The control information may be received via downlink control information (DCI) and/or medium access control (MAC) control element (CE).

A sounding reference signal (SRS) transmitted by other UE may be mapped to the RM resource.

Advantageous Effects

Embodiments of the disclosure have an effect of efficiently preventing a collision between SRS transmission and PUSCH transmission since resource location information to perform RM is explicitly/implicitly signaled.

Effects obtainable from the present disclosure are not limited by the effects mentioned above, and other effects which are not mentioned above can be clearly understood from the following description by those skilled in the art to which the present disclosure pertains.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure.

MODE FOR INVENTION

Figure 1:
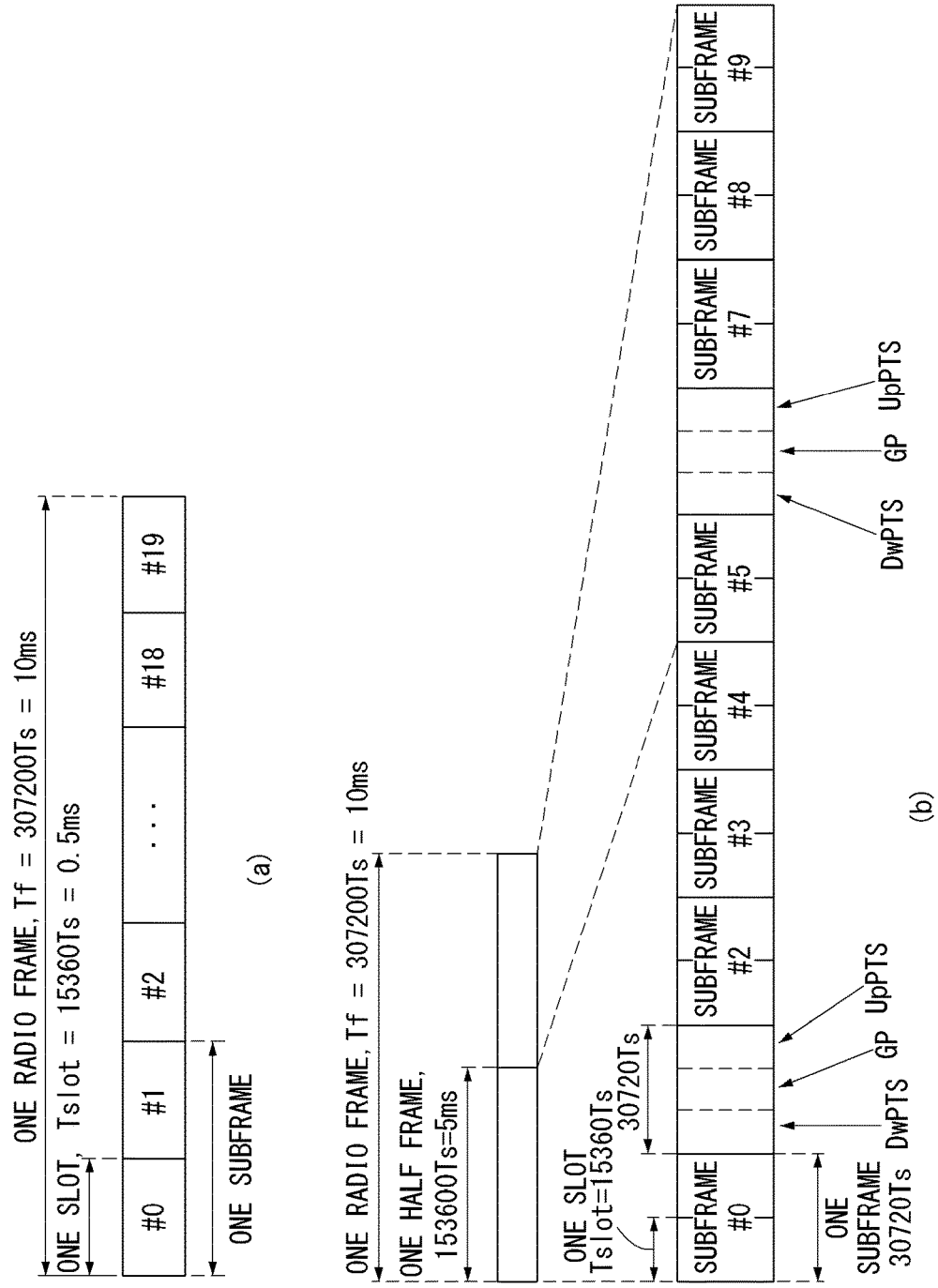
FIG. 1 shows the structure of a radio frame in a wireless communication system to which an embodiment of the present disclosure may be applied.

Some embodiments of the present disclosure are described in detail with reference to the accompanying drawings. A detailed description to be disclosed along with the accompanying drawings are intended to describe some exemplary embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

In the present disclosure, a base station is regarded as a terminal node of a network that performs communication directly with a user equipment (UE). In the present disclosure, particular operations described to be performed by the base station may be performed by a upper node of the base station, if necessary. That is, it is apparent that in a network consisting of a plurality of network nodes including the base station, various operations performed for communication with a UE can be performed by the base station or by network nodes other than the base station. The term 'base station (BS)' can be replaced by a fixed station, Node B, evolved-NodeB (eNB), a base transceiver system (BTS), an access point (AP), g-NodeB (gNB), new RAT (NR)/5G-NodeB, and the like. Further, 'terminal' can be fixed or mobile, and the term 'terminal' can be replaced by a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present disclosure, and the use of such specific terms may be changed in various forms without departing from the technical sprit of the present disclosure.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

General System to which the Present Disclosure May be Applied

FIG. 1 shows the structure of a radio frame in a wireless communication system to which an embodiment of the present disclosure may be applied.

3GPP LTE/LTE-A support a radio frame structure type 1 which may be applicable to Frequency Division Duplex (FDD) and a radio frame structure which may be applicable to Time Division Duplex (TDD).

FIG. 1(a) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" is indicative of a subframe for downlink transmission, "U" is indicative of a subframe for uplink transmission, and "S" is indicative of a special subframe including three types of a DwPTS, GP, and UpPTS. An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 below shows a configuration (length of DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_S$ | $2192 \cdot T_S$ | $2560 \cdot T_S$ | $7680 \cdot T_S$ | $2192 \cdot T_S$ | $2560 \cdot T_S$ |
| 1 | $19760 \cdot T_S$ | | | $20480 \cdot T_S$ | | |
| 2 | $21952 \cdot T_S$ | | | $23040 \cdot T_S$ | | |

TABLE 2-continued

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 3 | $24144 \cdot T_S$ | | | $25600 \cdot T_S$ | | |
| 4 | $26336 \cdot T_S$ | | | $7680 \cdot T_S$ | $4384 \cdot T_S$ | $5120 \cdot T_S$ |
| 5 | $6592 \cdot T_S$ | $4384 \cdot T_S$ | $5120 \cdot T_S$ | $20480 \cdot T_S$ | | |
| 6 | $19760 \cdot T_S$ | | | $23040 \cdot T_S$ | | |
| 7 | $21952 \cdot T_S$ | | | — | — | — |
| 8 | $24144 \cdot T_S$ | | | — | — | — |

The structure of a radio frame is only one example. The number of subcarriers included in a radio frame or the number of slots included in a subframe and the number of OFDM symbols included in a slot may be changed in various ways.

Figure 2:
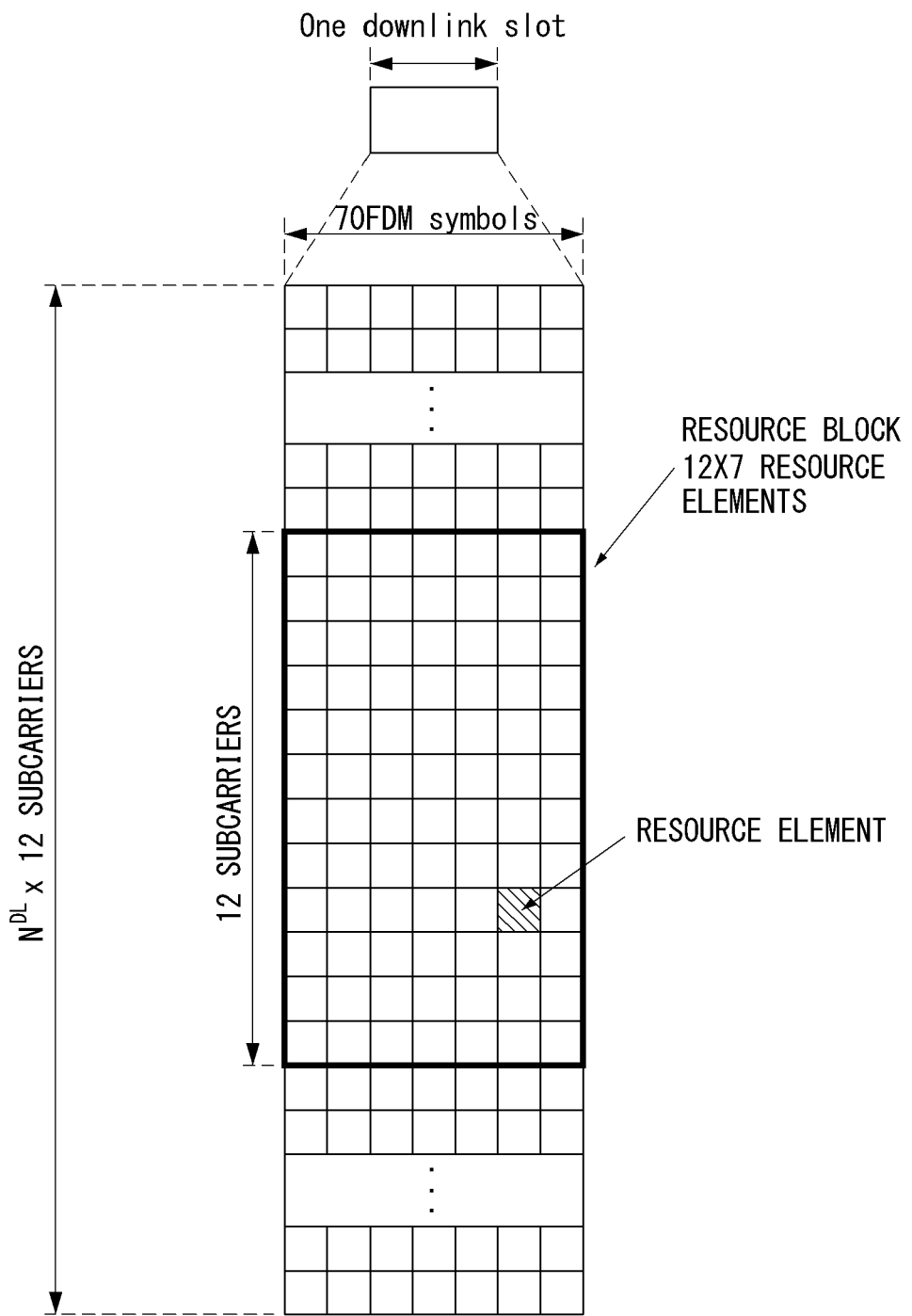
FIG. 2 is a diagram illustrating a resource grid for one downlink slot in a wireless communication system to which an embodiment of the present disclosure may be applied.

FIG. 2 is a diagram illustrating a resource grid for one downlink slot in a wireless communication system to which an embodiment of the present disclosure may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present disclosure is not limited thereto.

Each element on the resource grid is referred to as a resource element, and one resource block (RB) includes 12×7 resource elements. The number of RBs NDL included in a downlink slot depends on a downlink transmission bandwidth.

The structure of an uplink slot may be the same as that of a downlink slot.

Figure 3:
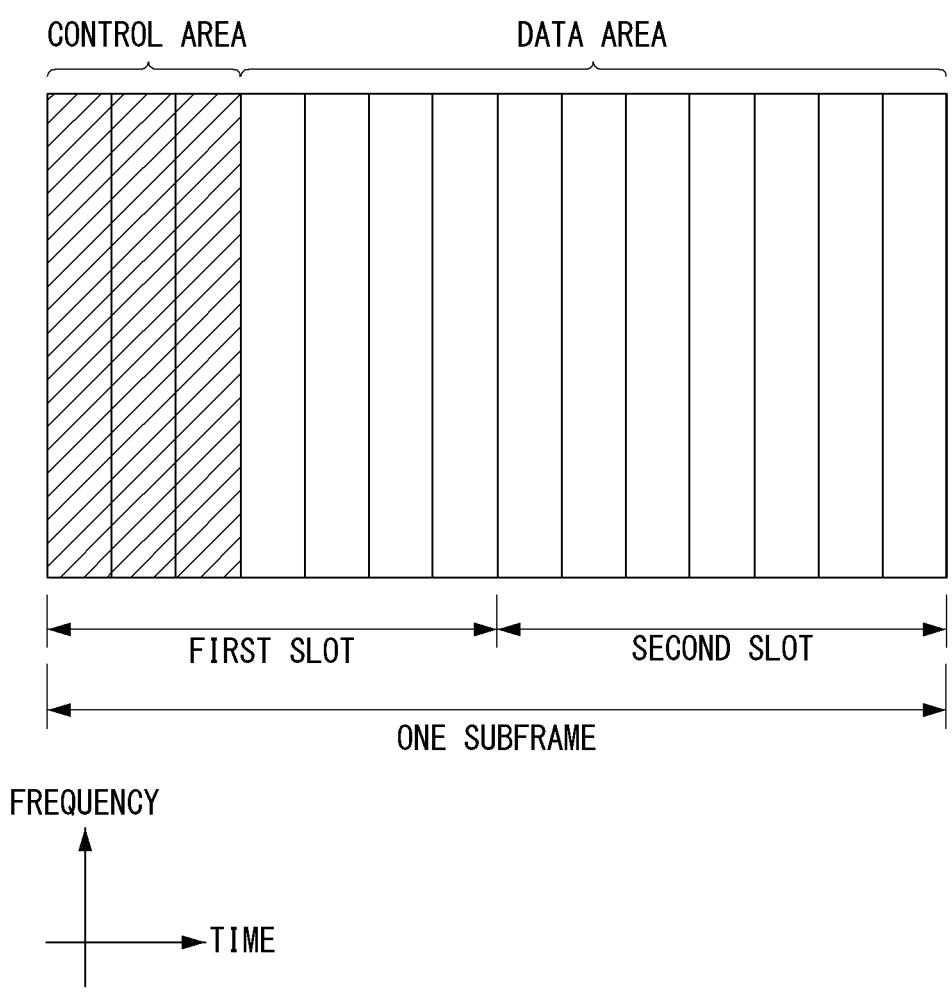
FIG. 3 shows the structure of a downlink subframe in a wireless communication system to which an embodiment of the present disclosure may be applied.

FIG. 3 shows the structure of a downlink subframe in a wireless communication system to which an embodiment of the present disclosure may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARD). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 4:
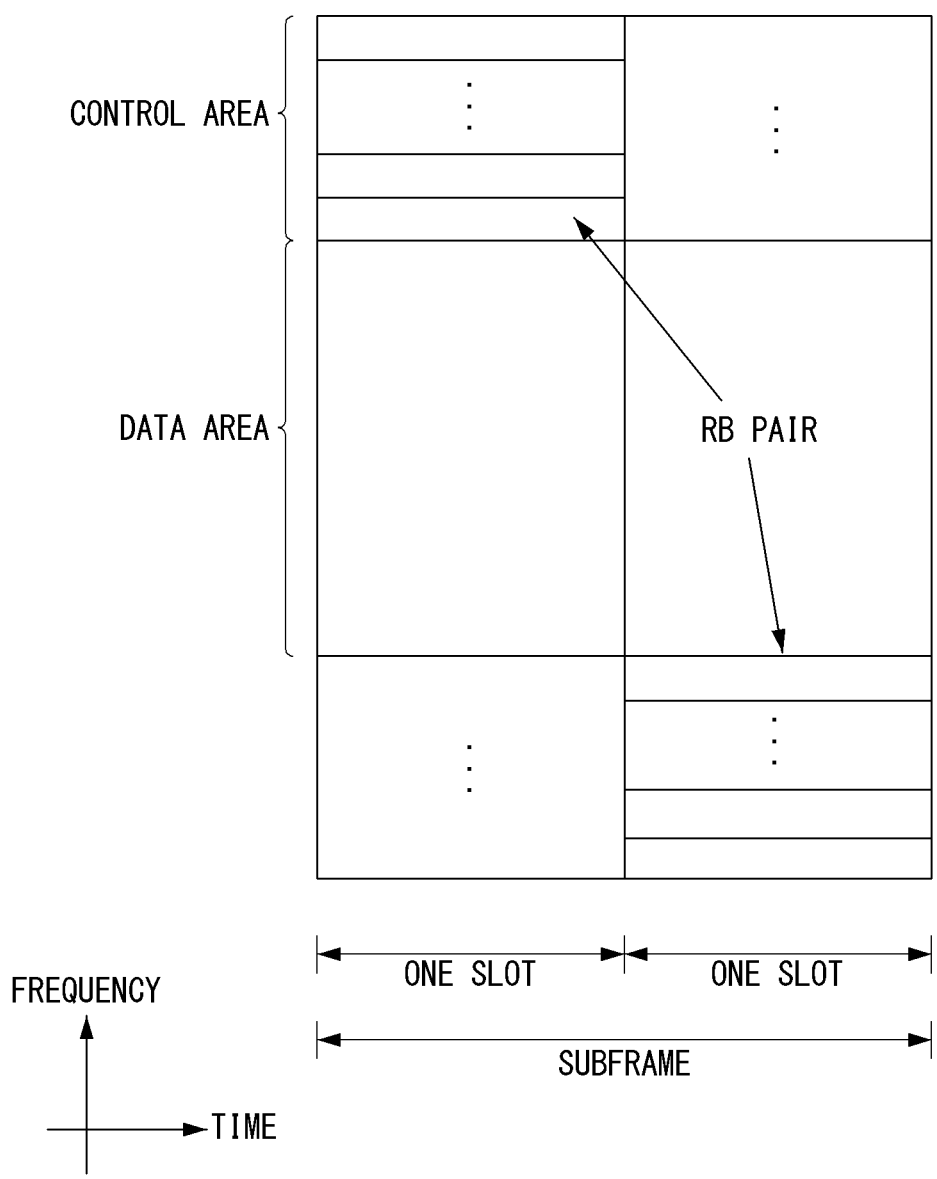
FIG. 4 shows the structure of an uplink subframe in a wireless communication system to which an embodiment of the present disclosure may be applied.

FIG. 4 shows the structure of an uplink subframe in a wireless communication system to which an embodiment of the present disclosure may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

As more communication devices require greater communication capacity, a necessity of mobile broadband communication which is more improved than the existing radio access technology (RAT) has been raised. In addition, the massive MTC (Machine Type Communications) that provides various services anytime and anywhere by connecting a plurality of devices and objects is also one of important issues, which is considered in a next generation communication. Moreover, it has been discussed a design of a communication system in which a service and/or a UE sensitive to reliability and latency. As such, an introduction of a next generation RAT has been discussed currently, which considers enhanced mobile broadband communication, massive MTC, Ultra-Reliable and Low Latency Communication (URLLC), and the like, and such a technology is referred to as 'new RAT (NR)'.

Self-Contained Subframe Structure

Figure 5:
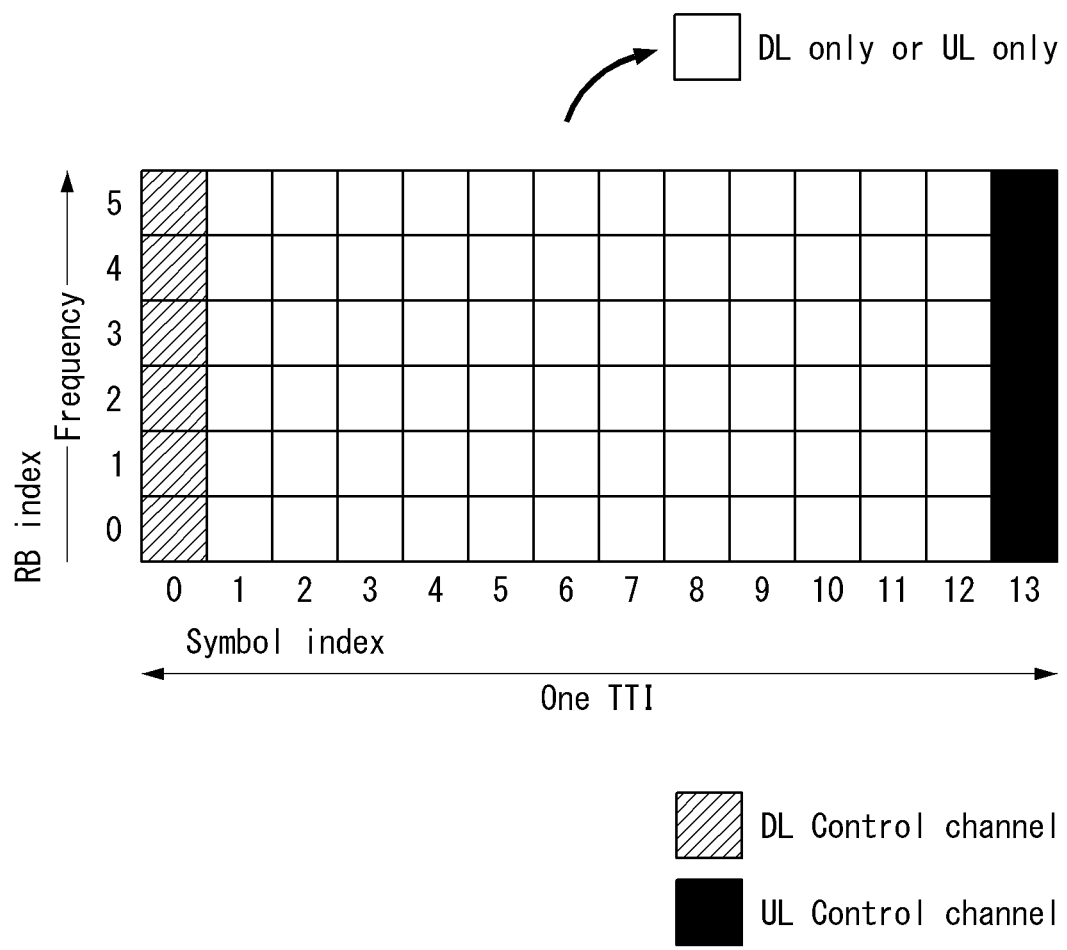
FIG. 5 illustrates a self-contained subframe structure to which the present disclosure may be applied.

FIG. 5 illustrates a self-contained subframe structure to which the present disclosure may be applied.

In TDD system, in order to minimize data transmission delay, the self-contained subframe structure as shown in FIG. 5 has been considered in 5 Generation new RAT. The shaded area in FIG. 5 shows a downlink control region, and the dark area shows an uplink control region. In addition, the area not marked in FIG. 5 may be used for a downlink (DL) data transmission or an uplink (UL) data transmission. In the characteristics of such a structure, a DL transmission and a UL transmission may be sequentially progressed in a subframe, a DL data may be transmitted and a UL ACK/NACK may be received in a subframe. Consequently, a time required for retransmitting data is reduced when a data transmission error occurs, and owing to this, the delay till the last data forwarding may be minimized.

As an example of the self-contained subframe structure which may be configured/setup in a system operating based on New RAT, the following at least four subframe types may be considered. Hereinafter, the durations existed in each of the subframe types are numerated in time sequence.

1) DL control duration+DL data duration+guard period (GP)+UL control duration

2) DL control duration+DL data duration

3) DL data duration+GP+UL control duration+UL control duration

4) DL data duration+GP+UL control duration

In such a self-contained subframe structure, a time gap is required for a process that an eNB and a UE switch from a transmission mode to a reception mode or a process that an eNB and a UE switch from a reception mode to a transmission mode. For this, a part of OFDM symbols on the timing switching from DL to UL may be setup as GP, and such a subframe type may be referred to as 'self-contained SF'.

Analog Beamforming

In Millimeter Wave (mmW) band, a wavelength becomes short and an installation of a plurality of antenna elements is available in the same area. That is, the wavelength in 30 GHz band is 1 cm, and accordingly, an installation of total 100 antenna elements is available in 2-dimensional arrangement shape with 0.5 lambda (wavelength) intervals in 5 by 5 cm panel. Therefore, in mmW band, beamforming (BF) gain is increased by using a plurality of antenna elements, and accordingly, coverage is increased or throughput becomes higher.

In this case, each antenna element has a Transceiver Unit (TXRU) such that it is available to adjust a transmission power and a phase, and independent beamforming is available for each frequency resource. However, it has a problem that effectiveness is degraded in a cost aspect when TXRUs are installed in all of about 100 antenna elements. Accordingly, a method has been considered to map a plurality of antenna elements in a single TXRU and to adjust a direction of beam by an analog phase shifter. Such an analog beamforming technique may make only one beam direction throughout the entire band, and there is a disadvantage that frequency selective beamforming is not available.

As a middle form between a Digital BF and an analog BF, B number of hybrid BF may be considered which is smaller than Q number of antenna element. In this case, directions of beams that may be transmitted simultaneously are limited lower than B number; even it is changed according to a connection scheme between B number of TXRUs and Q number of antenna elements.

Figure 6:
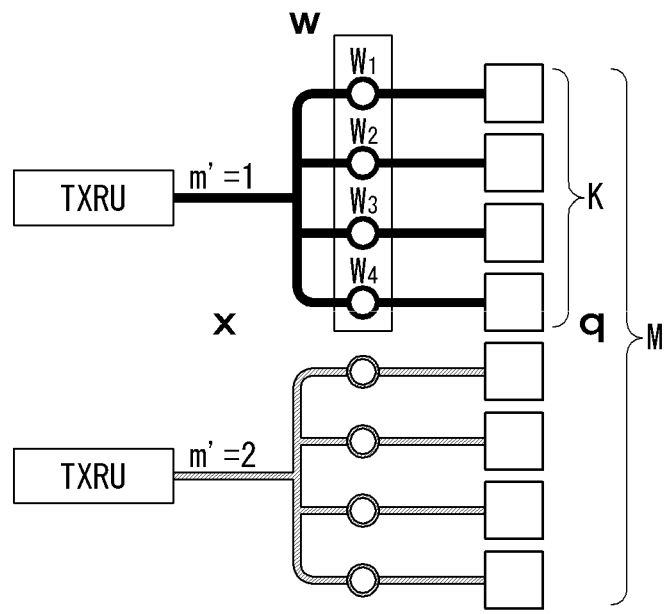
FIG. 6 exemplifies a sub-array partition model, which is a first TXRU virtualization model option.
Figure 7:
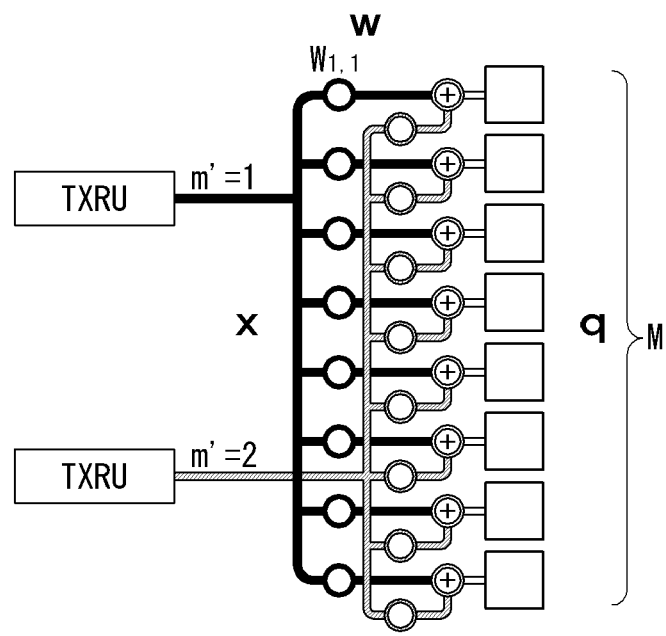
FIG. 7 exemplifies a full-connection model, which is a second TXRU virtualization model option.

FIGS. 6 and 7 illustrate a representative connection scheme between a TXRU and an antenna element. More particularly, FIG. 6 exemplifies a sub-array partition model, which is a first TXRU virtualization model option and FIG. 7 exemplifies a full-connection model, which is a second TXRU virtualization model option. In FIGS. 6 and 7, TXRU virtualization model represents a relation between an output signal of a TXRU and an output signal of an antenna element.

As shown in FIG. 6, in the case of the virtualization model in which a TXRU is connected to a sub-array, an antenna element is connected to only a single TXRU. Different from this, in the case of the virtualization model in which a TXRU is connected to all antenna elements, an antenna element is connected to all TXRUs. In these drawings, W represents a phase vector which is multiplied by an analog phase shifter. That is, a direction of analog beamforming is determined by W. Here, mapping between CSI-RS antenna ports and TXRUs may be 1 to 1 (1:1) or 1 to many (1:N).

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is mainly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna should be detected in order to accurately receive the signal. Accordingly, each transmission antenna should have an individual reference signal.

In a mobile communication system, an RS may be basically divided into two types depending on its purpose. There are an RS having a purpose of obtaining channel state information and an RS used for data demodulation. The former has a purpose of obtaining, by a UE, to obtain channel state information in the downlink, and accordingly, a corresponding RS should be transmitted in a wideband, and a UE should be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS should be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement may be provided using such RSs. That is, the DRS is used only for data demodulation, and the CRS is used for the two purposes of channel information acquisition and data demodulation.

The reception side (i.e., UE) measures a channel state based on a CRS and feedbacks an indicator related to channel quality, such as a channel quality indicator (CQI), a precoding matrix index (PMI) and/or a rank indicator (RI), back to the transmission side (i.e., an eNB). The CRS is also called a cell-specific RS. On the other hand, a reference signal related to the feedback of channel state information (CSI) may be defined as a CSI-RS.

In 3GPP LTE(-A) system, it is defined that a UE reports CSI to a BS. Here, the CSI is commonly called for the information that may represent a quality of a radio channel (or also referred to as a link) established between a UE and an antenna port. For example, the CSI may correspond to a rank indicator (RI), a precoding matrix indicator (PMI), and/or a channel quality indicator (CQI), and the like. Here, RI represents rank information of a channel, and this may mean the number of streams that a UE receives through the same time-frequency resource. Since RI is determined with being dependent upon long-term fading of a channel, the RI is fed back from a UE to a BS with a period longer than CQI, generally. PMI is a value that reflects a channel space property, and represents a precoding index that a UE prefers based on a metric such as SINR. CQI is a value that represents signal strength, and means a reception SINR that is obtainable when a BS uses the PMI, generally.

In 3GPP LTE(-A) system, a BS may setup a plurality of CSI processes to a UE, and may receive CSI report for each process. Here, the CSI process may include CSI-RS for signal quality measurement from a BS and CSI-interference measurement (CSI-IM) resource for interference measurement.

The DRS may be transmitted through resource elements if data demodulation on a PDSCH is required. A UE may receive information about whether a DRS is present through a higher layer, and the DRS is valid only in the case that a corresponding PDSCH has been mapped. The DRS may also be called a UE-specific RS or Demodulation RS (DMRS).

Figure 8:
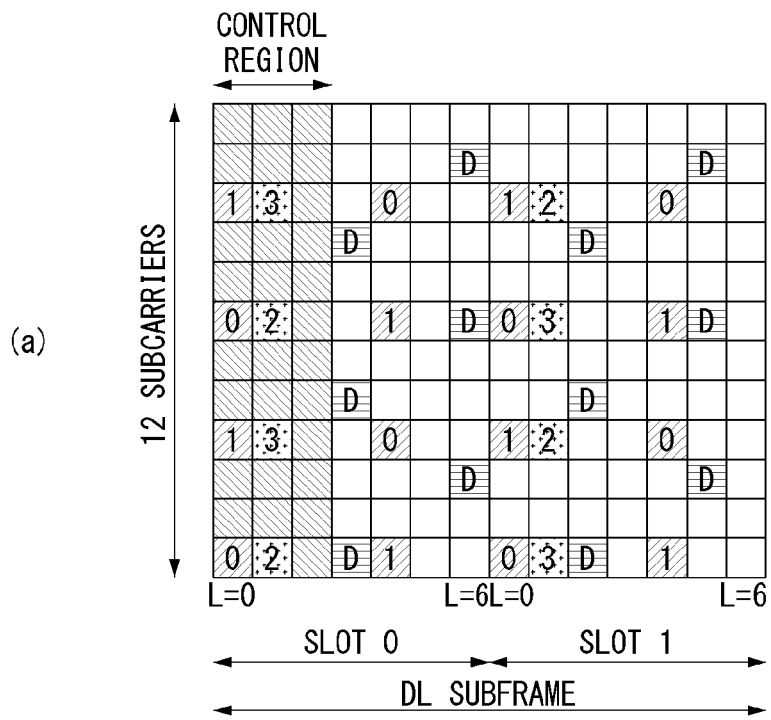
FIG. 8 illustrates reference signal patterns mapped to downlink resource block pairs in a wireless communication system to which the present disclosure may be applied.
Figure 8:
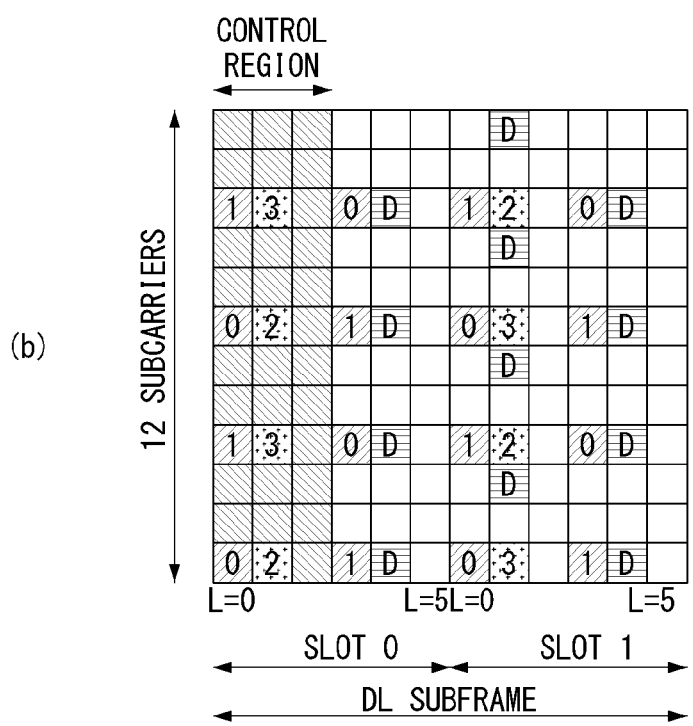

FIG. 8 illustrates reference signal patterns mapped to downlink resource block pairs in a wireless communication system to which the present disclosure may be applied.

Referring to FIG. 8, a downlink resource block pair, a unit in which a reference signal is mapped may be represented in the form of one subframe in a time domain X 12 subcarriers in a frequency domain. That is, in a time axis (an x axis), one resource block pair has a length of 14 OFDM symbols in the case of a normal cyclic prefix (CP) (in FIG. 7(a)) and has a length of 12 OFDM symbols in the case of an extended cyclic prefix (CP) (FIG. 7(b)). In the resource block lattice, resource elements (REs) indicated by '0', '1', '2', and '3' mean the locations of the CRSs of antenna port indices '0', '1', '2', and '3', respectively, and REs indicated by 'D' mean the location of a DRS.

In the case that an eNB uses a single transmission antenna, reference signals for a single antenna port are arrayed.

In the case that an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, in the case that an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user MIMO antenna.

In the case that a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

In an LTE-A system, that is, an evolved and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, in the case that an eNB has four to a maximum of eight downlink transmission antennas in the LTE-A system, RSs for these antenna ports must be additionally defined and designed. Regarding the RSs for the maximum of eight transmission antenna ports, both of the aforementioned RS for channel measurement and the aforementioned RS for data demodulation should be designed.

One of important factors considered in designing an LTE-A system is backward compatibility, that is, that an LTE UE should operate properly also in the LTE-A system, which should be supported by the system. From an RS transmission aspect, in the time-frequency domain in which a CRS defined in LTE is transmitted in a full band every subframe, RSs for a maximum of eight transmission antenna ports should be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement purpose for the selection of MCS or a PMI (channel state information-RS, channel state indication-RS (CSI-RS), etc.) and an RS for the demodulation of data transmitted through eight transmission antennas (data demodulation-RS (DM-RS)).

The CSI-RS for the channel measurement purpose is characterized in that it is designed for a purpose focused on channel measurement unlike the existing CRS used for purposes of measurement, such as channel measurement and handover, and for data demodulation. Furthermore, the CSI-RS may also be used for a purpose of measurement, such as handover. The CSI-RS does not need to be transmitted every subframe unlike the CRS because it is transmitted for a purpose of obtaining information about a channel state. In order to reduce overhead of a CSI-RS, the CSI-RS is intermittently transmitted on the time axis.

In the LTE-A system, a maximum of eight transmission antennas are supported in the downlink of an eNB. In the LTE-A system, in the case that RSs for a maximum of eight transmission antennas are transmitted in a full band in every subframe using the same method as the CRS in the existing LTE, RS overhead is excessively increased. Accordingly, in the LTE-A system, an RS has been separated into the CSI-RS of the CSI measurement purpose of the selection of MCS or a PMI and the DM-RS for data demodulation, and thus the two RSs have been added. The CSI-RS may also be used for a purpose, such as RRM measurement, but has been designed for a main purpose of the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

In order to measure a CSI-RS, a UE should be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB should notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined only for a subcarrier interval $\Delta f=15$ kHz.

RS Virtualization

In mmW band, a PDSCH transmission is available only to a single analog beam direction on a time by analog beamforming. As a result, an eNB is able to transmit data only to a small number of UEs in a specific direction. Accordingly, on occasion demands, analog beam direction is differently configured for each antenna port, and a data transmission may be performed to a plurality of UEs in several analog beam directions simultaneously.

Figure 9:
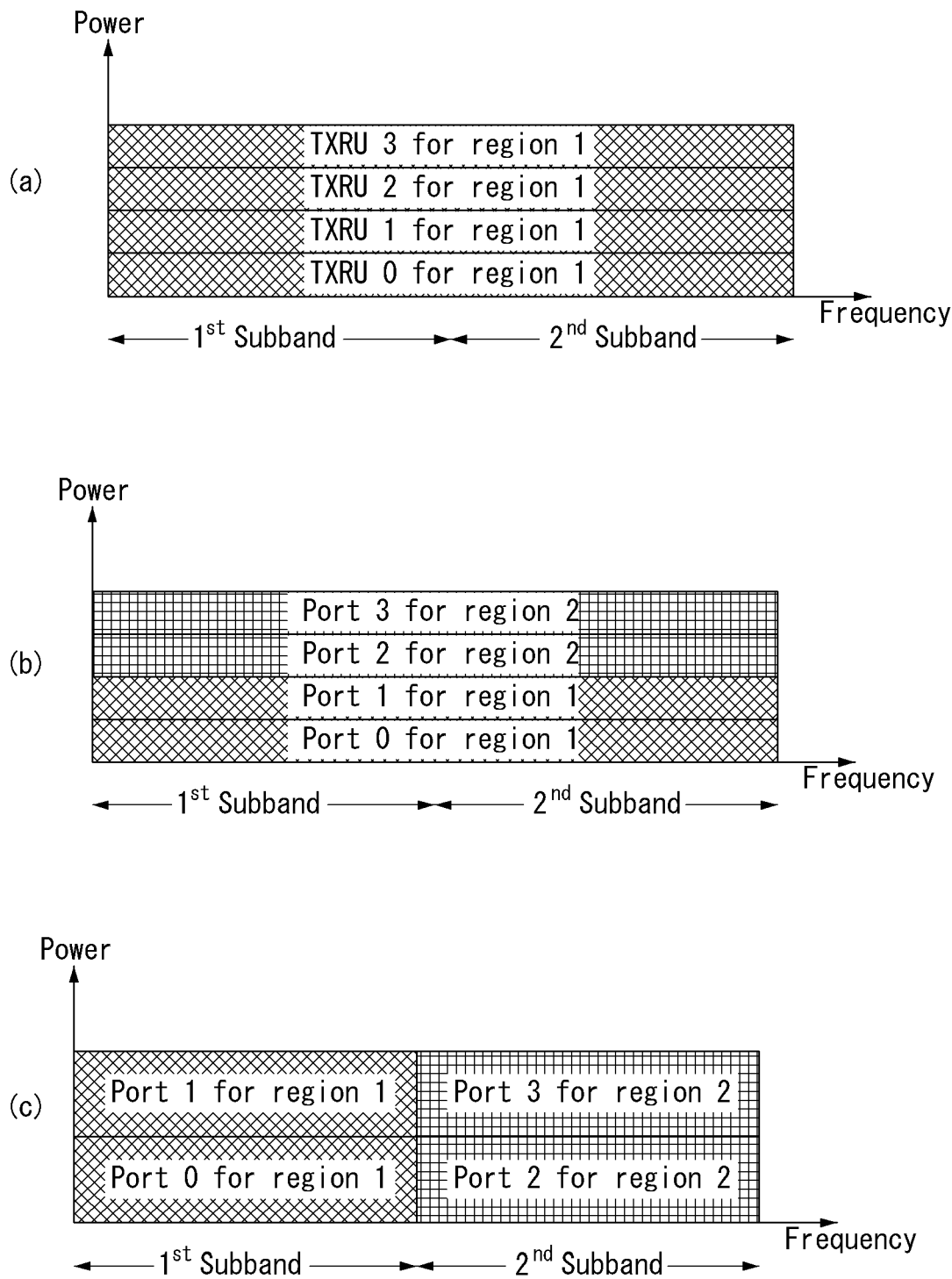
FIG. 9 is a diagram illustrating a service area for each TXRU.

Hereinafter, four sub-arrays are formed by dividing 256 antenna elements into four equal parts, and an exemplary structure in which a TXRU is connected to each sub-array shown in FIG. 9 is described mainly.

FIG. 9 is a diagram illustrating a service area for each TXRU.

When each sub-array includes total 64 (8×8) antenna elements in 2-dimensional array shape, a region corresponding to a horizontal angle area of 15 degrees and a vertical angle area of 15 degrees may be covered by specific analog beamforming. That is, a region in which an eNB is needed to serve is divided into a plurality of areas, and each area is served at a time. In the following description, it is assumed that CSI-RS antenna port and TXRU are mapped in 1-to-1 manner. Accordingly, an antenna port and a TXRU may have the same meaning in the following description.

As shown in an example of FIG. 9a, in the case that all TXRUs (antenna port, sub-array) have the same analog beamforming direction, the throughput of the corresponding region may be increased by forming a digital beam having higher resolution. In addition, the throughput of the corresponding region may be increased by increasing rank of transmission data to the corresponding region.

As shown in FIG. 9b, in the case that each TXRU (antenna port, sub-array) has different analog beamforming direction, a simultaneous data transmission becomes available in a corresponding subframe (SF) to UEs distributed in wider area. For example, among four antenna ports, two of them are used for a PDSCH transmission to UE1 in area 1 and the remaining two of them are used for a PDSCH transmission to UE2 in area 2.

FIG. 9b shows an example that PDSCH 1 transmitted to UE1 and PDSCH 2 transmitted to UE2 are Spatial Division Multiplexed (SDM). Different from this, FIG. 9c shows an example that PDSCH 1 transmitted to UE1 and PDSCH 2 transmitted to UE2 may be transmitted by being Frequency Division Multiplexed (FDM).

Between the scheme of serving an area by using all antenna ports and the scheme of serving several areas simultaneously by dividing antenna ports, in order to maximize cell throughput, a preferred scheme may be changed depending on a RANK and an MCS served to a UE. In addition, a preferred scheme may also be changed depending on an amount of data to be transmitted to each UE.

An eNB calculates cell throughput or scheduling metric that may be obtained when serving an area by using all antenna ports, and calculates cell throughput or scheduling metric that may be obtained when serving two areas by dividing antenna ports. The eNB compares the cell throughput or the scheduling metric that may be obtained through each scheme, and selects a final transmission scheme. Consequently, the number of antenna ports participated in a PDSCH transmission is changed for each SF (SF-by-SF). In order for an eNB to calculate a transmission MCS of a PDSCH according to the number of antenna ports and reflect it to scheduling algorithm, a CSI feedback from a UE proper to it may be requested.

Beam Reference Signal (BRS) and Beam Refinement Reference Signal (BRRS)

BRSs may be transmitted in at least one antenna port p={0, 1, . . . , 7}. BRS sequence $r_l(m)$ may be defined as Equation 1 below.

$$r_l(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$
$$m = 0, 1, \ldots, 8 \cdot (N_{RB}^{max,DL} - 18) - 1$$

In Equation 1, l=0, 1, . . . , 13 may represents an OFDM symbol number. In addition, c(i) represents a pseudo-random sequence generator, and may be initialized by Equation 2 on a starting point of each OFDM symbol.

$$C_{init} = 2^{10} \cdot (7 \cdot (n_s + 1) + l' + 1) \cdot (2 \cdot N_{ID}^{cell} + 1) + 2 \cdot N_{ID}^{cell} + 1 \quad \text{[Equation 2]}$$

$$n_s = \left\lfloor \frac{l}{7} \right\rfloor,$$

$$l' = l \bmod 7$$

BRRS may be transmitted in maximum eight antenna ports p=600, . . . , 607. A transmission and a reception of BRRS may be dynamically scheduled in a downlink resource allocation in xPDCCH.

BRRS sequence $r_{l,n_s}(m)$ may be defined as Equation 3 below.

$$r_{l,n_s}(m) = \frac{1}{\sqrt{2}}(1 - 2c(2m)) + j\frac{1}{\sqrt{2}}(1 - 2c(2m+1)), \quad \text{[Equation 3]}$$
$$m = 0, 1, \ldots, \left\lfloor \frac{3}{8} N_{RB}^{max,DL} \right\rfloor - 1$$

In Equation 3, ns represents a slot number in a radio frame, l represents an OFDM symbol number in the slot, and c(n) represents a pseudo-random sequence. The pseudo-random sequence generator may be initialized by Equation 4 on a starting point of each OFDM symbol.

$$c_{init} = 2^{10}(7(\bar{n}_s+1)+l+1)(2N_{ID}^{BRRS}+1)+2N_{ID}^{BRRS}+1$$

$$\bar{n}_s = n_s \bmod 20 \quad \text{[Equation 4]}$$

In Equation 4, $N_{ID}^{BRRS}$ may be set to a UE through RRC (Radio Resource Control) signaling.

BRS may be transmitted in every subframe, and may be transmitted in different analog beam directions for each port. Such a BRS may be used for an eNB to determine an approximate beam direction for a UE. When an approximate beam direction for a UE is determined based on BRS, an eNB may transmit BRRS for each of more accurate/minute analog beam directions within the determined analog beam direction range, and may determine more accurate analog beam direction.

As such, the name for the reference signal used for determining an analog beam direction for a UE is not limited to the BRS or the BRRS described above, and it is apparent that the name may be substituted by/referred to various reference signals that are usable for performing the same function. For example, the BRS may be substituted by/referred to primary/first CSI-RS, Primary synchronization signal/sequence (PSS), Secondary synchronization signal/sequence (SSS), Synchronization Signal/Sequence (SS) block, NR-PSS, and/or NR-SSS, and the BRRS may be substituted by/referred to secondary/second CSI-RS.

DL Phase Noise Compensation Reference Signal (DL PCRS)

A PCRS associated with xPDSCH may be transmitted in antenna port P=60 or P=61 as it is signaled in a DCI format. The PCRS is existed only in the case that xPDSCH transmission is associated with a corresponding antenna port, and the PCRS in this case may be a valid reference for phase noise compensation. The PCRS may be transmitted only in physical resource blocks and symbols to which corresponding xPDSCH is mapped. The PCRS may be the same in all symbols that correspond to xPDSCH allocation.

For both of the antenna ports P=60, 61, PCRS sequence r(m) may be defined as Equation 5 below.

$$r(m) = \frac{1}{\sqrt{2}}(1 - 2 \cdot c(2m)) + j\frac{1}{\sqrt{2}}(1 - 2 \cdot c(2m+1)), \quad \text{[Equation 5]}$$
$$m = 0, 1, \ldots, \lfloor N_{RB}^{max,DL}/4 \rfloor - 1$$

In Equation 5, c(i) represents pseudo-random sequence. The pseudo-random sequence generator may be initialized by Equation 6 on a starting point of each subframe.

$$c_{init} = (\lfloor n_s/2 \rfloor + 1) \cdot (2n_{ID}^{(nSCID)} + 1) \cdot 2^{16} + n_{SCID} \quad \text{[Equation 6]}$$

In the case that a value for $n_{ID}^{PCRS,i}$ is not provided by a higher layer, $n_{ID}^{(i)} = N_{ID}^{cell}$ Otherwise, $n_{ID}^{(i)} = n_{ID}^{PCRS,i}$ A value of n_SCID may be set to 0, unless it is particularly determined. In xPDSCH transmission, n_SCID may be provided by a DCI formation associated with xPDSCH transmission.

NR MIMO

The following techniques can be studied for NR UL MIMO.

1. Uplink transmission/reception schemes for data channels

Non-Reciprocity Based UL MIMO (e.g., PMI Based)
  Reciprocity based UL MIMO (e.g., UE derives precoder based on downlink RS measurement (including partial reciprocity)
  Support if MU-MIMO
  Open-loop/close-loop single/multi point spatial multiplexing (e.g., for multi-point spatial multiplexing (SM), a multi-layer is received either jointly or independently by different TRPs, and for multi-point SM, multi-point may have coordination)
  Single/multi panel spatial diversity
  Uplink antenna/panel switching (UE side)
  UL beamforming management for analog implementation
  Combination of above techniques 2. UL RS Design Considering the Below Functions
  Sounding
  Demodulation
  Phase noise compensation 3. UL Transmit Power/Timing Advance Control in the Context of UL MIMO 4. Transmission Scheme(s) for Carrying UL Control Information 5. Other UL MIMO and Related Techniques are not Precluded The following aspects for UL MIMO transmission should be supported:

1. Transmission Schemes/Methods for Reciprocity Calibrated UEs, Reciprocity Non-Calibrated UEs, and Non-Reciprocity/Partial Reciprocity Cases
  If needed, signalling associated with UL reciprocity based operation is introduced (e.g. UE capability which indicates calibration accuracy)

Whether to differentiate reciprocity non-calibrated UEs from non-reciprocity is to be studied At least one of the following candidate schemes/methods is to be supported:

1) Candidate 1: Codebook Based Transmission

Frequency selective and frequency non-selective precoding in a digital domain can be considered for a large system bandwidth. The support for the frequency selective precoding is conditioned on decision on NR waveform(s).

For example, BS-centric mechanism analogous to LTE

For example, UE-aided and BS-centric mechanism: the UE recommends candidate UL precoders from a predefined codebook to the BS based on DL RS measurement, and the BS determines a final precoder taken from the codebook.

For example, UE-centric and BS-aided mechanism: the BS provides CSI (e.g., channel response, interference-related information) to the UE, and the UE determines a final precoder based on the information from the BS.

2) Candidate 2: Non-Codebook Based Transmission

Frequency selective and frequency non-selective precoding in a digital domain can be considered for a large system bandwidth. The support for the frequency selective precoding is conditioned on decision on NR waveform(s).

For example, reciprocity based (based on DL RS) transmission only for calibrated UEs For example, UE-aided and BS-centric mechanism: the UE recommends candidate UL precoders to the BS based on DL RS measurement, and the BS determines a final precoder.

For example, UE-centric and BS-aided mechanism: the BS provides CSI (e.g. channel response, interference-related information) to the UE, and the UE determines the final precoder based on the information from the BS.

Other transmission schemes/methods are not precluded.

For UL precoder signaling for frequency selective/non-selective precoding, there may be the following examples.

Example 1: Signaling of single or multiple PMIs via DL control and/or data channels, and the multiple PMIs can be signaled via a single DCI or multi-level DCI (first level DCI contains a location indication to the second level DCI).

Example 2: For TDD, precoder calculation at the UE based on DL RS

The feasibility of frequency selective precoding is conditioned decision on, e.g., NR frame structure, waveform(s). Further, an impact on other system design aspects (e.g., DL control channel decoding performance/complexity) should be considered.

The use of UL frequency selective precoding for precoded transmission including precoder cycling may be considered.

For frequency selective precoding, UL precoding granularity (i.e., UL subband size) considering the following aspects may be determined:

Implicit (defined by the present disclosure) or explicit (by eNB/UE decision) signaling support Whether to align with DL Evaluation should include UL specific aspects such as cubic metric (CM) analysis according to UL waveform, etc.

A UE can be configured with an X-port sounding reference signal (SRS) resource. The SRS resource may span one or multiple OFDM symbols within a single slot.

For at least the purpose of CSI acquisition, a multi-symbol SRS resource can be configured such that the X SRS ports in each OFDM symbol are transmitted in different locations of the band in different OFDM symbols in the slot in a frequency hopping manner. This allows sounding a larger part of (or the full) UE bandwidth using narrower band SRS transmissions. In all the OFDM symbols, all X ports can be sounded in the same portion of the band.

Consider UE RF implementation aspects on SRS design that may place constraints on the design of the symbol-wise hopping pattern (e.g., required time for frequency re-tuning (if re-tuning needed) or transient period if re-tuning is not needed).

Mapping to Physical Resources

For each antenna port p used for transmission of the PUSCH in a subframe, the block of complex-valued symbols $z^{(\tilde{p})}(0), \ldots, z^{(\tilde{p})}(M_{symb}^{ap}-1)$ shall be multiplied with the amplitude scaling factor $\beta_{PUSCH}$ in order to conform to the transmit power $P_{PUSCH}$ specified in clause 5.1.1.1 in 3GPP TS 36.213 [4]. Further, the block of complex-valued symbols $z^{(\tilde{p})}(0), \ldots, z^{(\tilde{p})}(M_{symb}^{ap}-1)$ is mapped in sequence starting with $z^{(\tilde{p})}(0)$ to physical resource blocks on antenna port p and is assigned for transmission of PUSCH. The relation between the index $\tilde{p}$ and the antenna port number p is defined by LTE spec. For the mapping to resource elements (k,l) corresponding to the physical resource blocks assigned for transmission, the physical resource blocks are, not used for transmission of reference signals, and not part of the last SC-FDMA symbol in a subframe, if the UE transmits SRS in the same subframe in the same serving cell, and not part of the last SC-FDMA symbol in a subframe configured with cell-specific SRS for non-BL/CE (bandwidth limited low complexity/coverage enhancement) UEs and BL/CE UEs in CEModeA, if the PUSCH transmission partly or fully overlaps with the cell-specific SRS bandwidth, and not part of an SC-FDMA symbol(s) reserved for possible SRS transmission in a UE-specific aperiodic SRS subframe in the same serving cell, and not part of an SC-FDMA symbol(s) reserved for possible SRS transmission in a UE-specific periodic SRS subframe in the same serving cell when the UE is configured with multiple timing advance groups (TAGs).

In this case, the mapping to resource elements (k,l) corresponding to the physical resource blocks assigned for transmission shall be performed in increasing order of first the index k, then the index l, starting with the first slot in the subframe.

For BL/CE UEs in CEModeB, resource elements in the last SC-FDMA symbol in a subframe configured with cell-specific SRS shall be counted in the PUSCH mapping but not used for transmission of the PUSCH.

For BL/CE UEs, if one or more SC-FDMA symbol(s) are left empty due to a guard period for narrowband retuning, the affected SC-FDMA symbol(s) shall be counted in the PUSCH mapping but not used for transmission of the PUSCH.

If uplink frequency-hopping is disabled or the resource blocks allocated for PUSCH transmission are not contiguous in frequency, the set of physical resource blocks to be used for transmission is given by $n_{PRB}=n_{VRB}$, where $n_{VRB}$ is obtained from the uplink scheduling grant as described in clause 8.1 in 3GPP TS 36.213 [4].

If uplink frequency-hopping with type 1 PUSCH hopping is enabled, the set of physical resource blocks to be used for transmission is given by clause 8.4.1 in 3GPP TS 36.213 [4].

RM(Rate Matching) Signalling Method

In the existing LTE standard, when the UE has been scheduled with UL data (PUSCH) transmission, whether to map data to the last symbol in an RM operation for determining an RE location to map data may be determined depending on whether a subframe scheduled to the UE belongs to "cell-specific SRS subframe configuration". For example, if the subframe scheduled to the UE belongs to the "cell-specific SRS subframe configuration", an operation of rate matching the last symbol (i.e., not mapping data) has been applied. If the subframe scheduled to the UE does not belong to the "cell-specific SRS subframe configuration", an operation of not rate matching the last symbol (i.e., mapping data) (and/or whether to overlap a SRS transmission band and PUSCH and RM operation according to other conditions) has been applied. Basically, this is to pre-configure specific resource/subframe using the "cell-specific SRS subframe configuration" considering that potential SRS transmission of any UE for a corresponding symbol in a cell-specific perspective may exist, and to prevent a collision between SRS transmission and PUSCH transmission by not allowing data transmission on a corresponding symbol (e.g., the last symbol in a corresponding subframe) if data is transmitted in the subframe.

However, in the NR system, as an operation of "a UE can be configured with an X-port SRS resource, where the SRS resource spans one or multiple OFDM symbols within a single slot" is agreed, a case where two or more symbols in one slot are used in the SRS transmission even in the cell-specific perspective should be considered. Thus, more optimal and effective RM operation needs to be defined/configured on how a collision between the UEs upon UL data transmission can be avoided/prevented.

Accordingly, there is proposed an effective RM operation applicable to the NR system and other wireless communication systems below.

[Method #1] UE-Group-Specific SRS (Slot/Subframe) Configuration Introduction and Associated Operation Scheme Method #1 can be utilized in the scheduling so that SRS transmission and UL data scheduling between the UEs configured with each UE-group-specific SRS (slot/subframe) configuration are multiplexed by allowing a RM configuration scheme to basically follow a scheme configured at an RRC level as in the existing "cell-specific SRS subframe configuration" scheme and to be provided in a UE-group-specific configuration scheme (i.e., specifically configured on a per UE-group basis). Hence, there is an effect of avoiding excessive data RM application. Here, the specific UE-group may be targeted to only a single UE. That is, each UE-group may be configured to include at least one UE.

1-1. In this instance, a scheme may be defined/configured to divide cell-level RRC signalling of the existing LTE into several sets and transmit/indicate (one) specific (UE-group-specific SRS (slot/subframe) configuration) set to each UE (on RRC). In this case, each UE may apply the RM based on only information of the receiving/indicated (one) specific set. For example, if a slot on which the UE has to perform transmission of scheduled UL data is included in the set, the UE can initiate/perform the UL data transmission in a state of applying the RM for all specific time/frequency resource locations that the UE indicates in the corresponding set and should rate match.

And/or, based on the (one) specific set information, the UE may be defined/configured/indicated to map/transmit data (and/or UCI (e.g., if UCI piggyback)) for the following resource locations:

not used for transmission of reference signals, not part of symbol(s) indicated by the set in a slot, if the UE transmits (any) SRS in the same subframe (in the same serving cell), not part of symbol(s) indicated by the set in a slot, if the data/UCI transmission partly or fully overlaps with the SRS bandwidth (this may be independently indicated for each symbol) indicated by the set, not part of SC-FDMA symbol(s) reserved for possible SRS transmission in a UE-specific aperiodic SRS slot (in the same serving cell), and/or not part of symbol(s) reserved for possible SRS transmission in a UE-specific periodic SRS slot (in the same serving cell) when the UE is configured with multiple timing advanced groups (TAGs).

In this instance, a location of specific resources that the UE indicates in the corresponding set and should rate match may be restricted to the form constituted/configured/signalled/indicated with only time related information/index (e.g., symbol index(es) and/or symbol index bitmap). This means that the UE should rate match constituted/configured/signalled/indicated symbol(s) through the set in a scheduled band and transmit data.

Alternatively, a location of specific resources that should be rate matched may be defined/configured in the form constituted/configured/signalled/indicated with time related information/index (e.g., symbol index and/or symbol index bitmap, etc.) and/or frequency related information/index (e.g., a frequency resource assembly (e.g., able to be indicated/configured with SRS bandwidth) of a specific unit such as sets of RE(s), REG (RE group)(s), and/or RE(s)). This means that the UE should rate match symbol(s) and/or frequency resource(s) constituted/configured/signalled/indicated through the set and transmit data. In this instance, "frequency resource(s) (e.g., SRS bandwidth)" differently/independently/separately linked/associated per the indicated symbol index may be configured/indicated, and as a result, frequency resource(s) to which the rate matching should be applied per the indicated symbol index may be configured/indicated to the UE in a kind of hopping form. This considers that the corresponding UE or other UE may be configured/indicated to perform the SRS transmission on RM resources of actually the hopping form in the hopping form between symbols. Alternatively, this is because even if the SRS hopping (across the symbols) is not applied, different UEs can be configured to respectively transmit the SRS to different symbols in the same slot, and transmit the SRS to a different frequency resource for each symbol.

1-2. Alternatively, a scheme may be defined/configured to divide cell-level RRC signalling in the existing LTE into several sets and such that the base station configures a plurality of (UE-group-specific SRS (slot/subframe) configuration) sets to one UE on RRC and selects and indicates a set, which should be applied among the sets, to the UE on MAC (Medium Access Control) CE (Control Element) and/or DCI. Then, the UE may apply the RM based on only at least one set information that is selected and indicated by the base station among the plurality of sets. For example, if a slot on which the UE has to perform transmission of the scheduled UL data is included in the at least one indicated set(s), the UE can initiate/perform the UL data transmission in a state of applying the RM for (all) specific time/ frequency resource locations that the UE indicates in the corresponding set(s) and should rate match.

And/or, based on the at least one set(s) information, the UE may be defined/configured/indicated to map/transmit data (and/or UCI (e.g., if UCI piggyback)) for the following resource locations:
- not used for transmission of reference signals,
- not part of symbol(s) indicated by the set(s) in a slot, if the UE transmits (any) SRS in the same subframe (in the same serving cell),
- not part of symbol(s) indicated by the set(s) in a slot, if the data/UCI transmission partly or fully overlaps with the SRS bandwidth (this may be independently indicated for each symbol) indicated by the set(s),
- not part of SC-FDMA symbol(s) reserved for possible SRS transmission in a UE-specific aperiodic SRS slot (in the same serving cell), and/or
- not part of SC-FDMA symbol(s) reserved for possible SRS transmission in a UE-specific periodic SRS slot (in the same serving cell) when the UE is configured with multiple timing advanced groups (TAGs).

In this instance, embodiments of (constituting/configuring/signalling/indicating) a location of specific resources that the UE indicates in the corresponding set(s) and should rate match may follow at least one of the embodiments proposed in the above 1-1.

In relation to a scheme of additionally indicating to the above-described MAC CE and/or DCI, a scheme of down-selecting the specific set(s) with only MAC CE, etc. without DCI signalling may be preferentially applied. In this case, since DCI signalling is omitted, there is an advantage of saving L1 control signalling overhead. Then, this embodiment may be considered to be similar to the scheme described in the 1-1 in that the UE consistently applies the selected specific set(s) selected/indicated in the form of L2 signalling such as the MAC before separate L2 signalling for next update is indicated. That is, this embodiment may be interpreted to add an operation of switching/changing set(s), that is being currently applied, to the scheme described in the 1-1 via the L2 signalling such as the MAC. According to such a scheme, the base station can obtain an effect of appropriately switching/changing set(s) according to a further plan of scheduling/co-scheduling of data and/or SRS.

Regarding a scheme of additionally indicating to the MAC CE and/or DCI, if the base station selects and indicates set(s) to be applied by the UE by supporting only DCI signalling, or if DCI signalling is added to the MAC CE signalling and is supported, the base station can perform an operation of switching/changing the set(s) to be applied by the UE at each TTI level. In this case, flexibility that the set(s) which is a RM target indicated by DCI on a per TTI basis can be most dynamically selected/indicated can be provided. Ultimately, if the RM signalling follows a sequential indication structure, e.g., RRC→MAC→DCI, some of multiple sets configured with the RRC are down-selected via the L2 signalling such as the MAC, and final set(s) to be applied by the UE among the down-selected sets follows a structure dynamically indicated for each slot scheduled via DCI. Alternatively, if the RM signalling follows a sequential indication structure, e.g., RRC→DCI, final set(s) to be applied by the UE among multiple sets configured with the RRC follows a structure dynamically indicated for each slot scheduled via DCI.

[Method #2] (UL-Related) DCI Based Dynamic Symbol/Frequency-Level RM Signalling Method This scheme basically corresponds to a scheme of dynamically indicating RM of a specific symbol/frequency-level that will restrict and apply to a corresponding slot (or indicated specific slot(s)) via specific DCI (e.g., UL-related DCI, separate (common) DCI, or DL related DCI, etc.). Such an indication is applicable via L2 signalling such as MAC CE not DCI.

In this instance, a location of specific resources that the UE indicates in corresponding DCI (and/or MAC) and should rate match may be restricted to the form constituted/configured/signalled/indicated with only a time related index (e.g., symbol index(es) and/or symbol index bitmap, etc.). This means that the UE should rate match the symbol(s) constituted/configured/signalled/indicated through the set in a scheduled band and transmit data.

Alternatively, a location of specific resources that should be rate matched may be defined/configured in the form constituted/configured/signalled/indicated with time related information/index (e.g., symbol index(es) and/or symbol index bitmap, etc.) and/or frequency related information/index (e.g., a frequency resource assembly (e.g., indicated/configured as SRS bandwidth) of a specific unit such as sets of RE(s), REG (RE group)(s), and/or RE(s)). This means that the UE should rate match symbol(s) and/or frequency resource(s) constituted/configured/signalled/indicated through the set and transmit data. In this instance, "frequency resource(s) (e.g., SRS bandwidth)" differently/independently/separately linked/associated per the indicated symbol index may be configured/indicated, and as a result, frequency resource(s) to which the rate matching should be applied per the indicated symbol index may be configured/indicated to the UE in a kind of hopping form. This considers that the corresponding UE or other UE may be configured/indicated to perform the SRS transmission on RM resources of actually the hopping form in the hopping form between symbols. Alternatively, this is because even if the SRS hopping (across the symbols) is not applied, different UEs may be configured to respectively transmit the SRS to different symbols in the same slot, and transmit the SRS to a different frequency resource for each symbol.

And/or, in the above method, "potential SRS region" in a specific time section (e.g., in a specific slot) may be restricted only to a region of contiguous symbols (from the last symbol as in LTE or based on a specific symbol location). In this case, the indicated symbol index(es) to apply the RM may be designed as an indication field having a bit width, that is more optimal and saved through information encoding, not a bitmap form. For example, if the number of symbols in the potential SRS region is 'Y', a field with a bit width of ceil(log 2(Y)) may be designed. Ultimately, it is characterized in that encoding for a size and code-points of the RM indication field can be designed with a specific function associated with a value of 'Y'.

And/or, in the above method, "potential SRS region" in a specific time section (e.g., in a specific slot) may be allowed to be spanned to a region of non-contiguous symbols in a time domain. Unless otherwise specified as described above, the description of DCI filed may be typically indicated in a bitmap form of a symbol-level (e.g., if 7 symbols are spanned, 3 bits may be required).

And/or, as described above, if RM application information about a frequency domain is added to time domain information, a size of a corresponding indication field description may further increase. If an encoding scheme for each code point "configures/indicates frequency resources(s) differently/independently/separately linked for each symbol index" as described above, it can provide high flexibility, but a signalling overhead increases as much as the provided flexibility. To relieve such a control signaling overhead burden, a method is applicable in which it does not "configure/indicate frequency resources(s) differently/independently/separately linked for each symbol index" and indicates specific frequency resource(s) commonly configured/applied in a specific time section (e.g., in a specific slot) for the use of RM application. This may be restricted to, for example, a form in which a form (or hopped frequency domain/resource) taking a union for a hopped frequency domain is commonly configured/applied for the use of the RM application as described above, even if SRS transmission is applied in a frequency hopping manner for each symbol.

That is, which form frequency resource(s) for the RM application is configured/indicated depends on gNB implementation, and the gNB may optimize a region to indicate the RM according to scheduling/co-scheduling plan about data and/or SRS transmission for each UE/between UEs and may configure/indicate this.

The specific "frequency resource(s)" mentioned in the present disclosure is restricted to contiguous frequency resources, or may be allowed/supported to extend to non-contiguous frequency resources. The former case reduces the signalling overhead, but reduces data and/or SRS scheduling flexibility. The latter case increases the signalling overhead, but reduces data and/or SRS scheduling restriction. And/or, the indicated "frequency resource(s)" may be restricted to the form in which RM signalling is defined/configured (dependently) only for a resource allocation/assignment (RA) field in a specific UL grant. Here, the specific UL grant may be restricted to the same DCI as DCI to which the RM signalling/indication is transmitted, and may correspond to a specific UL grant to which a before and after application rule/relation with DCI for the RM signalling/indication is previously defined/configured. For example, a specific rule/relation about an interpretation based on/dependent on most recently received specific DCI information may be predefined (e.g., DCI for RM may be interpreted based on/dependent on a RA field of most recently received UL grant).

And/or, the RA field may be a resource allocation area indicated/configured by semi-persistent/static data scheduling. If "frequency resource(s)" for RM operates only for a specific scheduled band in the indicated form as above, there is an advantage of reducing the signalling overhead.

Regarding at least one of the RM related proposed operations, "waveform-specific" RM related operations may be configured independently/differently according to what UL transmission waveform (e.g., SC-FDMA, CP-OFDM, etc.) is (configured with). This is because single carrier properties (and/or peak-to-average power ratio (PAPR) issue), etc. may differ in an importance acting on the UL transmission depending on the waveform. And/or, at least one of the RM related proposed operations may also be designed to be UE-specifically (or UE-group-specifically) configurable. That is, since a different operation scenario may be considered for each UE(s), at least one RM related proposed operation proposed above can be independently/differently configured/applied for each UE(s), and thus there is an advantage of increasing network management flexibility.

And/or, regarding at least one of the RM related proposed operations, whether an operation finally taken by the UE is the RM (i.e., in which, as rate matching, the mapping of data/UCI is not performed (or skipped) at a specific resource location) or the puncturing (e.g., data/UCI is mapped at a specific resource location and is transmitted by puncturing (e.g., forced to zero-power) the corresponding resource location upon transmission) is independently/differently defined or configurable (per the above-described RM related condition).

And/or, regarding at least one of the RM related proposed operations, if a resource location which is a RM target is, for example, a location at which data related DMRS (e.g., PUSCH DMRS) is mapped, an operation of dropping the SRS transmission may be basically defined/configured. More specifically, for example, the following operation may be defined/configured/indicated to:

drop all SRS transmissions on overlapping symbol(s), or drop SRS transmission on overlapping symbol(s) on a per RB(s) basis that is the unit of specific sequence generation (e.g., in case of block-wise sequence generation, transmission while dropping a block (partially) overlapping the RB(s) that is on a per block basis and not dropping a block not overlapping the RB(s), etc.), or drop SRS transmission on only an overlapping portion (in the minimum unit of sequence) of the overlapping symbol(s).

As dynamic Tx timing is introduced, UL grant to PUSCH, SRS triggering DCI, and a transmission time (or a time interval) between aperiodic SRSs can be independently configured. In this case, if a processing time required to change the PUSCH mapping is insufficient as SRS transmission (at the same location as a PUSCH resource location) is triggered after data (PUSCH) is scheduled, the UE behaviour as to whether a resource location of the PUSCH mapping is processed in RM processing or puncturing processing may be defined/configurable/indicated. And/or, a specific timeline that is a reference to apply such a behavior may be defined/configured/indicated together or separately (e.g., "if SRS transmission is triggered at a time in (or exceeding) X slots after data (PUSCH) is scheduled", etc.).

And/or, basically, the selection between the RM and the puncturing can also apply a scheme defined/configurable/indicated in the form determined depending on/based on whether UCI/SRS transmission is 1) periodic, or 2) aperiodic and triggered via PUSCH grant, or 3) aperiodic and triggered via DCI different from the PUSCH grant (e.g., it is defined/configured/indicated to select/apply the RM in case of the 1)/2) and select/apply the puncturing considering the missing of the DCI in case of the 3).

And/or, regarding at least one of the RM related proposed operations, an operation to apply the RM and/or the puncturing upon transmission of PUCCH may be defined/configured/indicated separately/independently.

And/or, regarding at least one of the RM related proposed operations, if data/UCI and SRS transmission are performed together on a specific symbol, an UL transmission power scaling operation may be prescribed. For example, if a sum of a transmission power amount according to UL power control of data/UCI and a corresponding SRS transmission power amount according to SRS power control exceeds a total of UL transmittable power amount, it may be defined/configured/indicated so that the UE should consider the SRS as a first priority of power on which power-scaling (e.g., scaling-down) has to be performed (e.g., the power scaling-down is performed until the sum does not exceed the total of UL transmittable power amount). And/or, it may be defined/configured/indicated so that the UE should consider the PUSCH (or PUCCH) as a second priority of power on which power-scaling (e.g., scaling-down) has to be performed.

Figure 10:
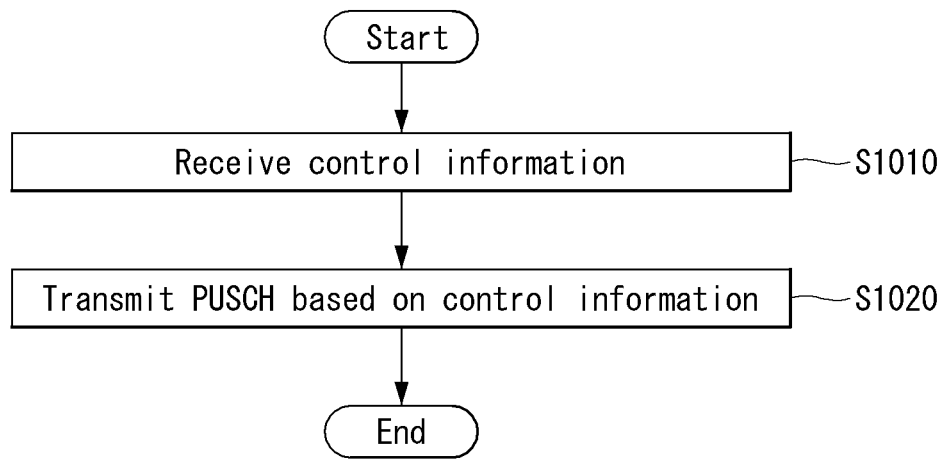
FIG. 10 is a flow chart illustrating an RM method of a UE according to an embodiment of the disclosure.

FIG. 10 is a flow chart illustrating an RM method of a UE according to an embodiment of the disclosure. The embodiments described above can be equally/similarly applied to the flow chart of FIG. 10, and duplicate descriptions are omitted.

First, a UE may receive (from a base station) control information for a PUSCH transmission in S1010. In this instance, the control information may include RM information indicating time and/or frequency information on a RM resource location to which the PUSCH is not mapped. The RM information may indicate symbol index information and/or symbol location bitmap information as the time information, and may indicate resource element information, resource element group information, and/or resource block information as the frequency information.

The frequency information may be associated and indicated independent from the time information for each RM resource, or may be commonly associated and indicated with the time information for a plurality of RM resources. The time information may be restricted to indicate symbols that are contiguously or non-contiguously located in a time domain, and the frequency information may be restricted to indicate resource elements that are contiguously or non-contiguously located in a frequency domain.

A SRS transmitted by other UE may be mapped to the RM resource. Further, the control information may be included in DCI and/or MAC CE and transmitted. A frequency location of the RM resource may be determined considering a frequency band scheduled to the UE by a RA field in an UL grant that is additionally pre-configured to the frequency information. For example, the frequency location of the RM resource may be determined as an area overlapping a frequency band scheduled to the UE among the frequency information. In this instance, the pre-configured UL grant may be restricted to the same DCI as the DCI including the RM information, or may be restricted to DCI having a before and after relation predefined with the DCI including the RM information.

Next, the UE may transmit the PUSCH based on the control information in S1020. In this case, the UE may map the PUSCH to a resource excluding the RM resource to transmit the PUSCH, or may map the PUSCH to a resource including the RM resource, the RM resource being zero-padded (i.e., punctured) and transmitted. In this instance, whether to map (or puncture) to the RM resource of the PUSCH may be determined based on whether a transmission of the SRS is periodic and/or whether the SRS transmission of the other UE has been triggered via the same DCI as the PUSCH. And/or, whether to map (or puncture) to the RM resource of the PUSCH may be determined based on an interval between a scheduling time of the PUSCH and a SRS transmission triggering time for the other UE. For example, if an interval between two times is equal or less than (or exceeds) a pre-configured time, the UE may map the PUSCH to the RM resource, and the RM resource at a transmission time may be zero-padded (or punctured).

Overview of Device to which the Present Disclosure is Applicable

Figure 11:
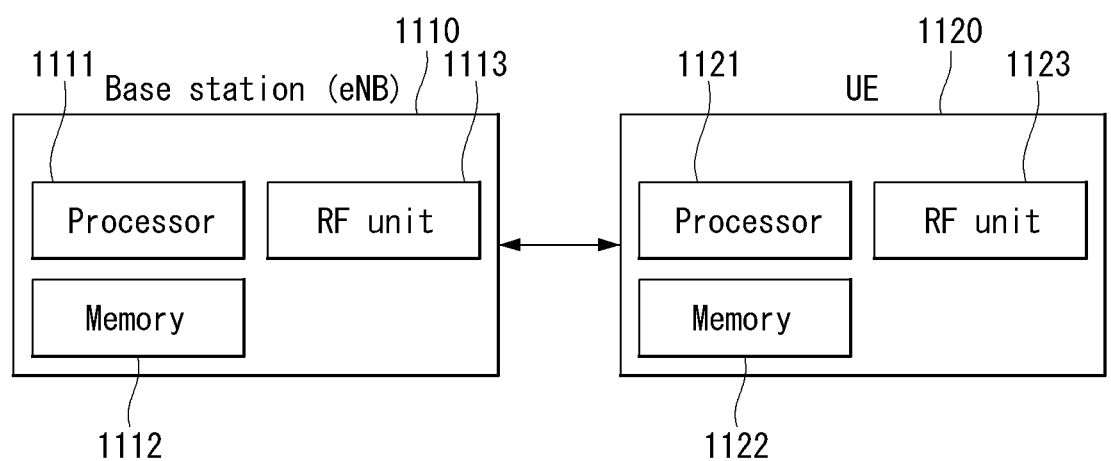
FIG. 11 illustrates a block configuration diagram of a wireless communication device according to an embodiment of the disclosure.

FIG. 11 illustrates a block configuration diagram of a wireless communication device according to an embodiment of the disclosure.

Referring to FIG. 11, a wireless communication system includes a base station (or eNB) 1110 and a plurality of UEs 1120 located in an area of the base station 1110.

The base station 1110 includes a processor 1111, a memory 1112, and a radio frequency (RF) unit 1113. The processor 1111 implements functions, processes, and/or methods proposed above. Layers of radio interface protocol may be implemented by the processor 1111. The memory 1112 is connected to the processor 1111 and stores various types of information for driving the processor 1111. The RF unit 1113 is connected to the processor 1111 and transmits and/or receives a radio signal.

The UE 1120 includes a processor 1121, a memory 1122, and a RF unit 1123. The processor 1121 implements functions, processes, and/or methods proposed above. Layers of radio interface protocol may be implemented by the processor 1121. The memory 1122 is connected to the processor 1121 and stores various types of information for driving the processor 1121. The RF unit 1123 is connected to the processor 1121 and transmits and/or receives a radio signal.

The memories 1112 and 1122 may be inside or outside the processors 1111 and 1121 and may be connected to the processors 1111 and 1121 through various well-known means. Further, the base station 1110 and/or the UE 1120 may have a single antenna or multiple antennas.

Figure 12:
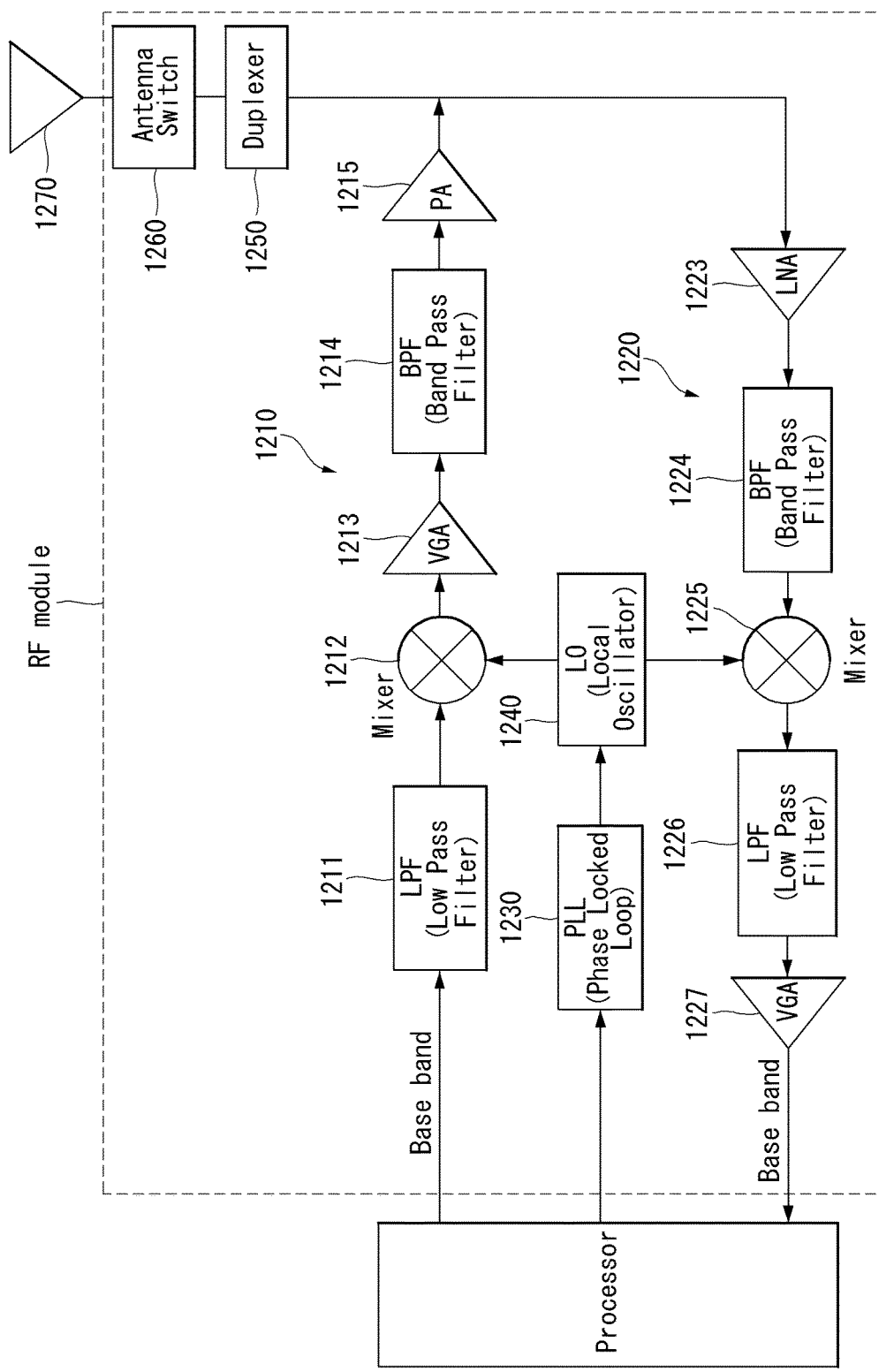
FIG. 12 illustrates an example of an RF module of a wireless communication device to which a method proposed by the present disclosure is applicable.

FIG. 12 illustrates an example of an RF module of a wireless communication device to which a method proposed by the present disclosure is applicable.

More specifically, FIG. 12 illustrates an example of an RF module that can be implemented in a frequency division duplex (FDD) system.

First, in a transmission path, the processor described above processes data to be transmitted and provides an analog output signal to a transmitter 1210.

In the transmitter 1210, the analog output signal is filtered by a low pass filter (LPF) 1211 to remove images caused by a digital-to-analog conversion (ADC), is up-converted from a baseband to an RF by an up-converter (mixer) 1212, and is amplified by a variable gain amplifier (VGA) 1213, and the amplified signal is filtered by a filter 1214, is additionally amplified by a power amplifier (PA) 1215, is routed through duplexer(s) 1250/antenna switch(es) 1260, and is transmitted through an antenna 1270.

Further, in a reception path, the antenna 1270 receives signals from the outside and provides the received signals, and the signals are routed through the antenna switch(es) 1260/duplexers 1250 and are provided to a receiver 1220.

In the receiver 1220, the received signals are amplified by a low noise amplifier (LNA) 1223, are filtered by a bans pass filter 1224, and are down-converted from the RF to the baseband by a down-converter (mixer) 1225.

The down-converted signal is filtered by a low pass filter (LPF) 1226 and is amplified by a VGA 1227 to obtain an analog input signal, and the analog input signal is provided to the processor described above.

Further, a local oscillator (LO) generator 1240 generates transmitted and received LO signals and provides them to the up-converter 1212 and the down-converter 1225, respectively.

In addition, a phase locked loop (PLL) 1230 receives control information from the processor in order to generate the transmitted and received LO signals at appropriate frequencies and provides control signals to the LO generator 1240.

The circuits illustrated in FIG. 12 may be arranged differently from the configuration illustrated in FIG. 12.

Figure 13:
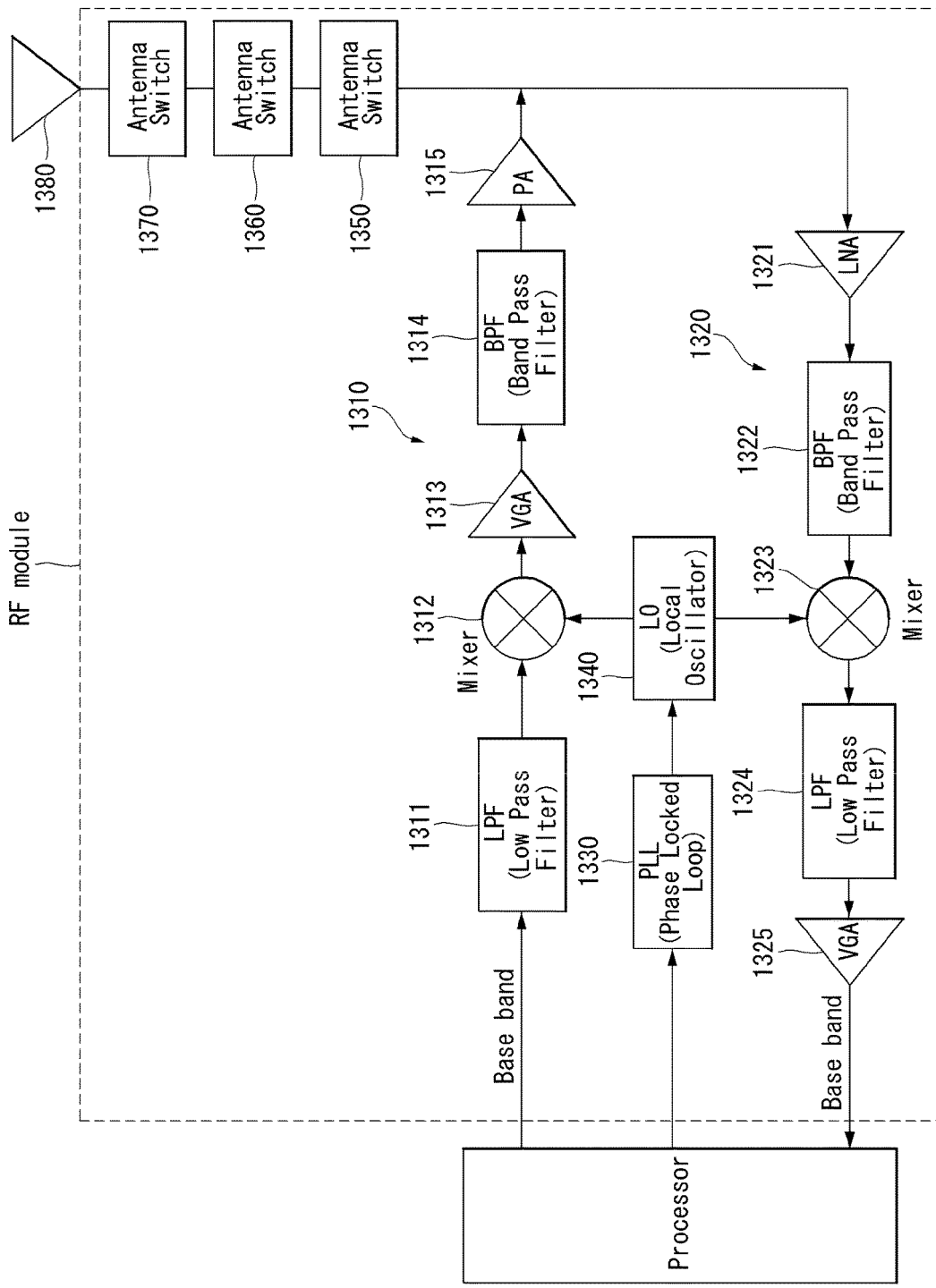
FIG. 13 illustrates another example of an RF module of a wireless communication device to which a method proposed by the present disclosure is applicable.

FIG. 13 illustrates another example of a RF module of a wireless communication device to which a method proposed by the present specification is applicable.

More specifically, FIG. 13 illustrates an example of an RF module that can be implemented in a time division duplex (TDD) system.

A transmitter 1310 and a receiver 1320 of the RF module in the TDD system have the same structure as the transmitter and the receiver of the RF module in the FDD system.

Hereinafter, only the structure of the RF module of the TDD system that differs from the RF module of the FDD system will be described, and the same structure will refer to the description of FIG. 10.

A signal amplified by a power amplifier (PA) 1315 of the transmitter 1310 is routed through a band select switch 1350, a band pass filter (BPF) 1360, and antenna switch(es) 1370 and is transmitted via an antenna 1380.

Further, in a reception path, the antenna 1380 receives signals from the outside and provides the received signals, and the signals are routed through the antenna switch(es) 1370, the band pass filter 1360, and the band select switch 1350 and are provided to the receiver 1320.

In the aforementioned embodiments, the elements and characteristics of the present disclosure have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present disclosure. The sequence of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

Meanwhile, the expression 'A and/or B' may be interpreted to mean at least one of A and/or B.

An embodiment of the present disclosure may be implemented by various means, for example, hardware, firmware, software or a combination of them. In the case of implementations by hardware, an embodiment of the present disclosure may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present disclosure may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

INDUSTRIAL APPLICABILITY

Although the present disclosure has been described focusing on examples applied to the 3GPP LTE/LTE-A/NR systems, it is also applicable to various wireless communication systems other than the 3GPP LTE/LTE-A/NR systems.

The invention claimed is:

1. A method of transmitting uplink data by a user equipment (UE) in a wireless communication system, the method comprising:
receiving configuration information related to rate matching of the uplink data, wherein the configuration information includes (i) first information for indicating a symbol to which the rate matching is applied in a time domain and (ii) second information for indicating a resource block to which the rate matching is applied in a frequency domain, wherein the first information is in a form of a bitmap, with each bit of the bitmap corresponding to a respective symbol in a slot; and
transmitting the uplink data based on the configuration information, wherein the uplink data is rate matched on (i) the symbol in the time domain indicated by the first information and (ii) the resource block in the frequency domain indicated by the second information.

2. The method of claim 1, wherein the configuration information includes a plurality of configurations, with each configuration comprising the first information and the second information.

3. The method of claim 2, further comprising:
receiving control information indicating a specific configuration among the plurality of configurations.

4. The method of claim 3, wherein the uplink data is rate matched based on the first information and the second information associated with the specific configuration.

5. The method of claim 4, wherein the uplink data is rate matched based on a waveform of the uplink data.

6. The method of claim 3, wherein the configuration information is received via Radio Resource Control (RRC) signaling, and
wherein the control information is received via downlink control information (DCI).

7. The method of claim 6, wherein the uplink data is transmitted via physical uplink shared channel (PUSCH).

8. The method of claim 6, wherein a sounding reference signal (SRS) transmitted by another UE is mapped to the symbol and the resource block to which the uplink data is rate matched.

9. The method of claim 8, wherein whether to apply rate matching to the uplink data is determined based on whether a transmission of the SRS is periodic or not.

10. The method of claim 9, wherein the uplink data is punctured instead of being rate matched.

11. The method of claim 1, wherein a location of the resource block indicated by the second information is configured commonly to symbols in the slot.

12. A user equipment (UE) configured to transmit uplink data in a wireless communication system, the UE comprising:
a transceiver configured to transmit and receive a radio signal; and
a processor configured to control the transceiver,
wherein the processor is configured to control the UE to perform operations comprising:
receiving configuration information related to rate matching of the uplink data, wherein the configuration information includes (i) first information for indicating a symbol to which the rate matching is applied in a time domain and (ii) second information for indicating a resource block to which the rate matching is applied in a frequency domain, wherein the first information is in a form of a bitmap, with each bit of the bitmap corresponding to a respective symbol in a slot; and transmitting the uplink data based on the configuration information, wherein the uplink data is rate matched on (i) the symbol in the time domain indicated by the first information and (ii) the resource block in the frequency domain indicated by the second information.

13. The UE of claim 12, wherein the configuration information includes a plurality of configurations, with each configuration comprising the first information and the second information.

14. The UE of claim 13, wherein the operations further comprise:

receiving control information indicating a specific configuration among the plurality of configurations.

15. The UE of claim 14, wherein the uplink data is rate matched based on the first information and the second information associated with the specific configuration.

16. The UE of claim 15, wherein the uplink data is rate matched based on a waveform of the uplink data.

17. The UE of claim 15, wherein the configuration information is received via Radio Resource Control (RRC) signaling, and wherein the control information is received via downlink control information (DCI).

* * * * *